(12) United States Patent
Cupit

(10) Patent No.: US 11,534,705 B2
(45) Date of Patent: *Dec. 27, 2022

(54) FILTER ASSEMBLY

(71) Applicant: Icon Technology Systems Limited, Altrincham (GB)

(72) Inventor: David Cupit, Yarmouth (GB)

(73) Assignee: Icon Technology Systems Limited, Altrincham (GB)

(*) Notice: Subject to any disclaimer, the term of this patent is extended or adjusted under 35 U.S.C. 154(b) by 14 days.

This patent is subject to a terminal disclaimer.

(21) Appl. No.: 16/319,285

(22) PCT Filed: Jul. 19, 2017

(86) PCT No.: PCT/GB2017/052126
§ 371 (c)(1),
(2) Date: Jan. 18, 2019

(87) PCT Pub. No.: WO2018/015751
PCT Pub. Date: Jan. 25, 2018

(65) Prior Publication Data
US 2019/0282934 A1    Sep. 19, 2019

(30) Foreign Application Priority Data

Jul. 20, 2016 (GB) .................................... 1612600

(51) Int. Cl.
*B01D 29/15* (2006.01)
*B01D 35/147* (2006.01)
*B01D 35/30* (2006.01)

(52) U.S. Cl.
CPC ......... *B01D 29/15* (2013.01); *B01D 35/1475* (2013.01); *B01D 35/30* (2013.01)

(58) Field of Classification Search
CPC .... B01D 29/15; B01D 27/10; B01D 35/1475; B01D 35/147; B01D 35/30; B01D 35/31; B01D 2201/167
(Continued)

(56) References Cited

U.S. PATENT DOCUMENTS 9,662,598 B2    5/2017   Cupit
2010/0032359 A1*  2/2010  Gillenberg ............ B01D 29/111
                                                          210/232

(Continued)

FOREIGN PATENT DOCUMENTS

DE    2725787 A1    12/1978
GB    577510 A      5/1946
(Continued)

OTHER PUBLICATIONS

International Search Report and the Written Opinion of the International Seaching Authority for International Application No. PCT/GB/052126 dated Nov. 2, 2017.
(Continued)

*Primary Examiner* — Akash K Varma
(74) *Attorney, Agent, or Firm* — Womble Bond Dickinson (US) LLP

(57) ABSTRACT

A filter assembly comprises a fluid inlet, a fluid outlet and a filter medium for receipt of fluid from the fluid inlet and for supplying filtered fluid to the fluid outlet, the filter medium being located between the fluid inlet and the fluid outlet. The assembly further comprises pressure-limiting means, such as a pressure-relieving valve, located between the fluid inlet and the filter medium.

17 Claims, 8 Drawing Sheets

(58) Field of Classification Search
USPC ......................................................... 210/130
See application file for complete search history.

(56) References Cited

U.S. PATENT DOCUMENTS

| | | | |
|---|---|---|---|
| 2010/0078375 A1* | 4/2010 | Mount | ............... B01D 35/1576 210/234 |
| 2013/0186815 A1* | 7/2013 | Cupit | .................... B01D 29/96 210/232 |
| 2020/0206656 A1 | 7/2020 | Cupit | |

FOREIGN PATENT DOCUMENTS

| | | | | |
|---|---|---|---|---|
| GB | 2477942 A | 8/2011 | | |
| WO | 2006/051336 A2 | 5/2006 | | |
| WO | WO-2006051336 A2 * | 5/2006 | ........... | B01D 35/147 |

OTHER PUBLICATIONS

UK IPO Search Report for Great Britain Application No. GB1612600.5 dated Jan. 16, 2017.

* cited by examiner

FILTER ASSEMBLY

CROSS REFERENCE TO RELATED APPLICATIONS

This patent application is a U.S. National Phase Application Under 35 U.S.C. § 371 of International Application No. PCT/GB2017/052126, filed on Jul. 19, 2017, entitled FILTER ASSEMBLY, which claims the benefit of priority of Great Britain patent application No. 1612600.5, filed Jul. 20, 2016.

The present invention relates to filter assemblies and in particular, but not exclusively, to filter assemblies comprising canister-type, in-line filters. The invention is particularly applicable to the field of water, and potable water, filtration, but is equally applicable to filtering of other fluids.

A known filter is described in our earlier published patent application WO2011/101652A2. That document discloses a filter insert having a body portion and a closed-ended tube, an open end of which is sealingly affixed around the periphery of the body portion. An inlet aperture and an outlet aperture communicate via a through hole in the body portion with the interior of the tube and a filter medium is located within the tube and is sealingly interposed between the inlet aperture and the outlet aperture. The tube is at least partially manufactured of a flexible plastics material and the body portion is relatively rigid.

It is important to ensure that the pressure of fluid supplied to the inlet is kept below a threshold pressure, to avoid damage to the filter medium. This can be achieved by locating a pressure relief valve in the fluid inlet pipe upstream of the inlet aperture. However, this requires selection of the appropriate pressure relief valve to ensure that it is compatible with the filter located downstream and also requires a separate fitting operation.

It is an object of the present invention to provide a filter assembly which overcomes, or alleviates, the problems associated with the prior art.

In accordance with the present invention, a filter assembly comprises:
- a fluid inlet;
- a fluid outlet; and
- a filter medium for receipt of fluid from the fluid inlet and for supplying filtered fluid to the fluid outlet, the filter medium being located between the fluid inlet and the fluid outlet,
- the assembly further comprising:
- pressure-limiting means located between the fluid inlet and the filter medium.

By providing pressure-limiting means as part of the valve assembly, it is possible to ensure that the filter medium will not be damaged as a result of excessive incoming fluid pressure. It also removes the need to fit a separate pressure-limiting valve upstream of the fluid inlet, which would require selection of the appropriate valve and a separate fitting operation.

Preferably, the pressure-limiting means comprises a pressure relief valve.

Preferably, the pressure relief valve comprises a valve closure member releasably engageable with a valve seat connected to the fluid inlet.

The pressure relief valve preferably comprises spring means engaged with the valve closure member for urging the valve closure member in a preferred direction.

In one embodiment, the spring means urge the valve closure member away from engagement with the valve seat.

In one embodiment, wherein when the valve closure member is disengaged from the valve seat, fluid pressure is applied to a first surface of the valve closure member which produces a first force urging the valve closure member in a first direction and to a second surface of the valve closure member which produces a second force urging the valve closure member in a second direction opposite to the first direction.

Preferably, the first and second forces are unequal.

Preferably, wherein the net effect of the first and second forces urges the valve closure member towards engagement with the valve seat.

The filter assembly may comprise a spigot connected to the fluid inlet, the valve seat being located at the distal end of the spigot.

The filter assembly preferably further comprises air bleed means, for example an air bleed passage.

In one embodiment, the valve closure member comprises a piston displaceable within a bore.

The filter assembly preferably further comprises an air bleed passage connected to the bore.

The filter assembly may further comprise means for limiting the displacement of the piston in a direction away from engagement with the valve seat.

The filter assembly may further comprise a filter insert comprising a body portion and a closed-ended tube, an open end of which is sealingly affixed around the periphery of the body portion, an inlet aperture and an outlet aperture, each aperture communicating via a through hole in the body portion with the interior of the tube, the filter medium being located within the tube and being sealingly interposed between the inlet aperture and the outlet aperture.

The filter assembly may further comprise a connector and a housing detachably affixable to the connector; the fluid inlet and fluid outlet being located on the connector; and the filter insert being removably receivable in the housing; the filter insert comprising inlet and outlet apertures releasably and sealingly connectable to corresponding apertures of the connector and a substantially fluid impermeable barrier surrounding the insert and being arranged to prevent the fluid from coming into contact with the housing.

The filter assembly may further comprise a locking collar for releasably locking the housing to the connector.

The filter assembly may further comprise a part-turn locking mechanism having a first position in which the housing is locked to the connector, a second position in which the housing is retained to the connector but capable of the axial movement relative to it and a third unlocked position in which the housing is unblocked from the connector.

The filter assembly may further comprise a flow control valve to restrict flow of fluid through the connector when the housing is detached from the connector.

In one embodiment, the filter assembly comprises a first flow control valve connected to the fluid inlet and a second flow control valve connected to the fluid outlet.

Preferably, the or each flow control valve is located in the connector.

The filter assembly may further comprise a housing in which the inlet, the outlet and the pressure-limiting means are located.

By way of example only, a specific embodiment of the present invention will now be described with reference to the accompanying drawings, in which.

Figure 5:
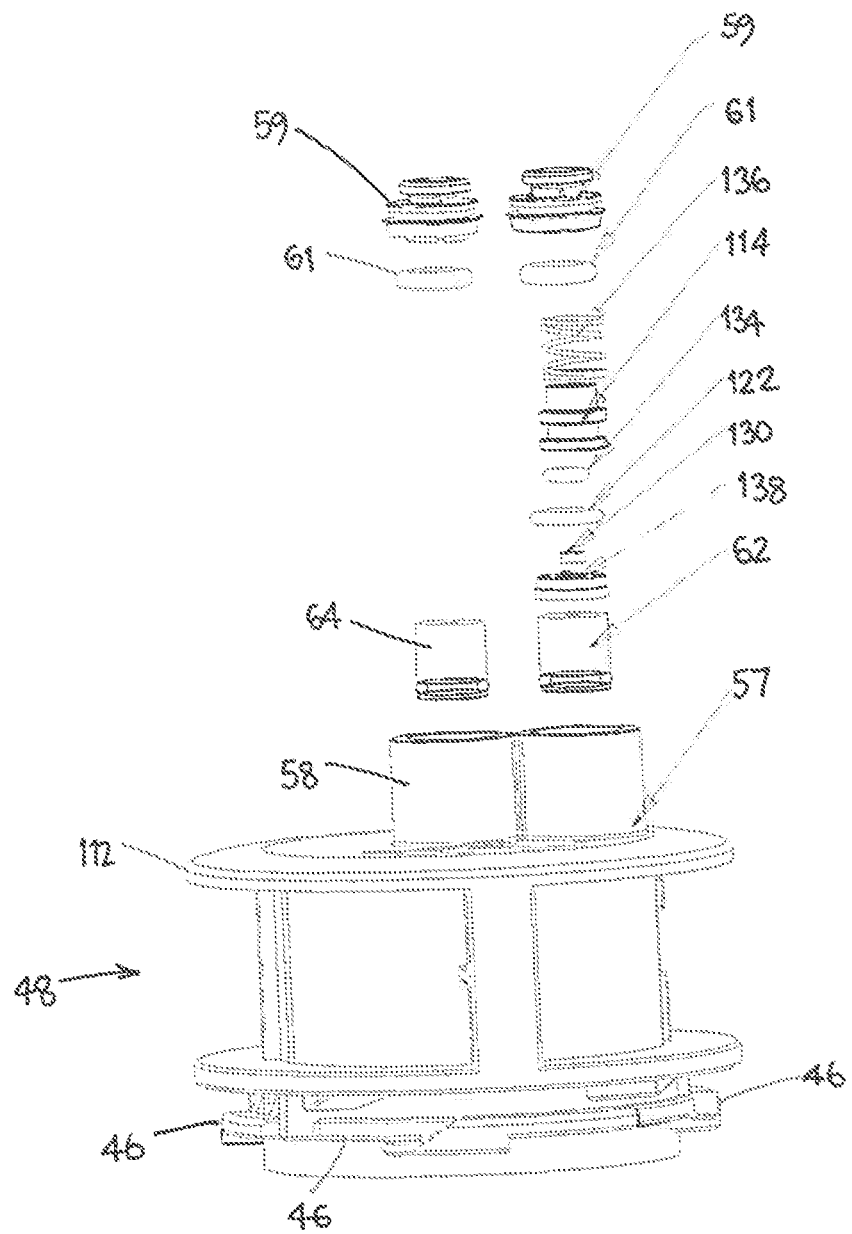
FIG. 5 is an exploded perspective view of a connecting portion of the filter assembly of FIG. 1.
Figure 6:
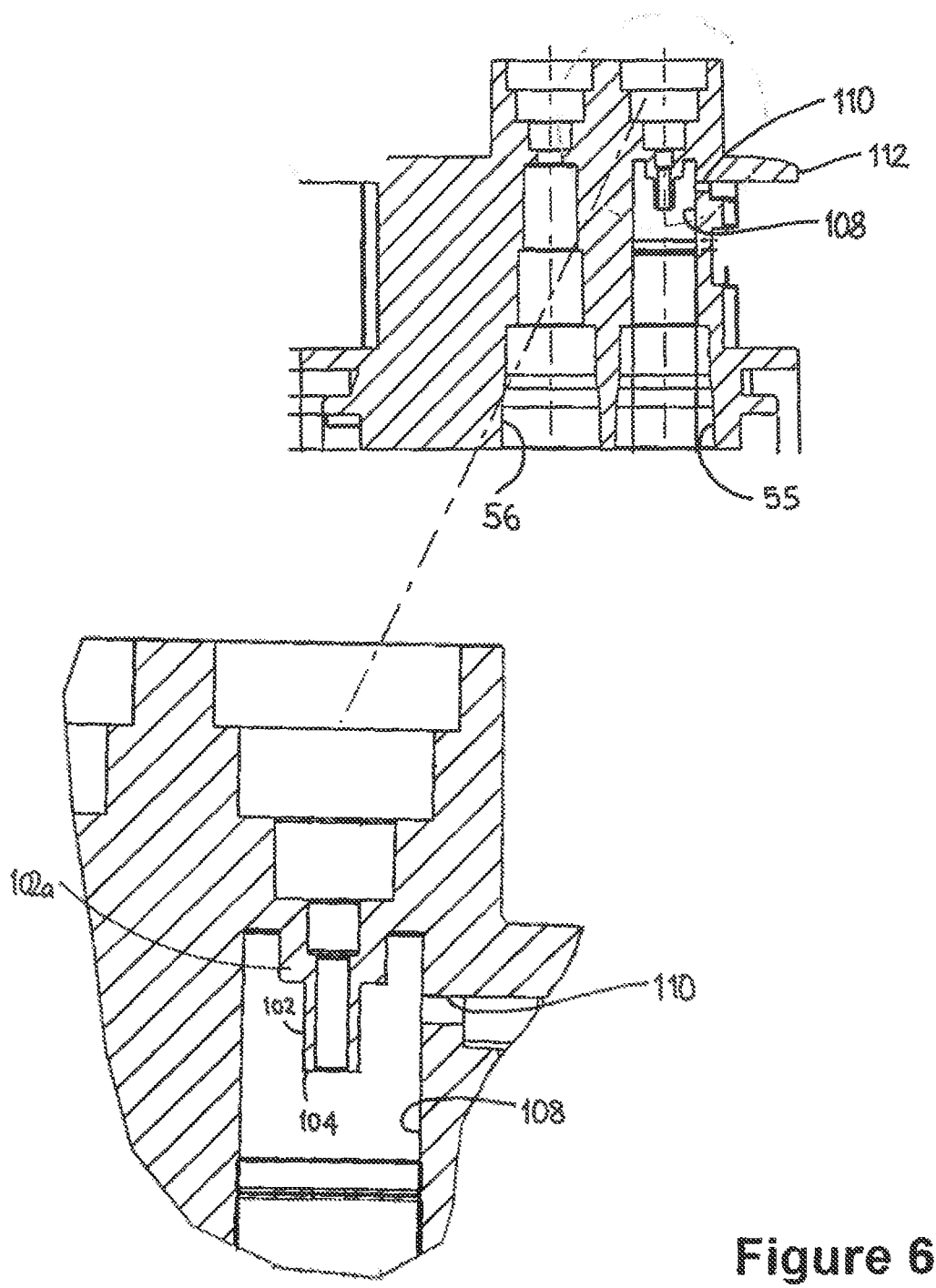
FIG. 6 is a vertical cross-section through the housing of the connecting portion of FIG. 3, with the so-called portion shown to a larger scale.
Figure 7A:
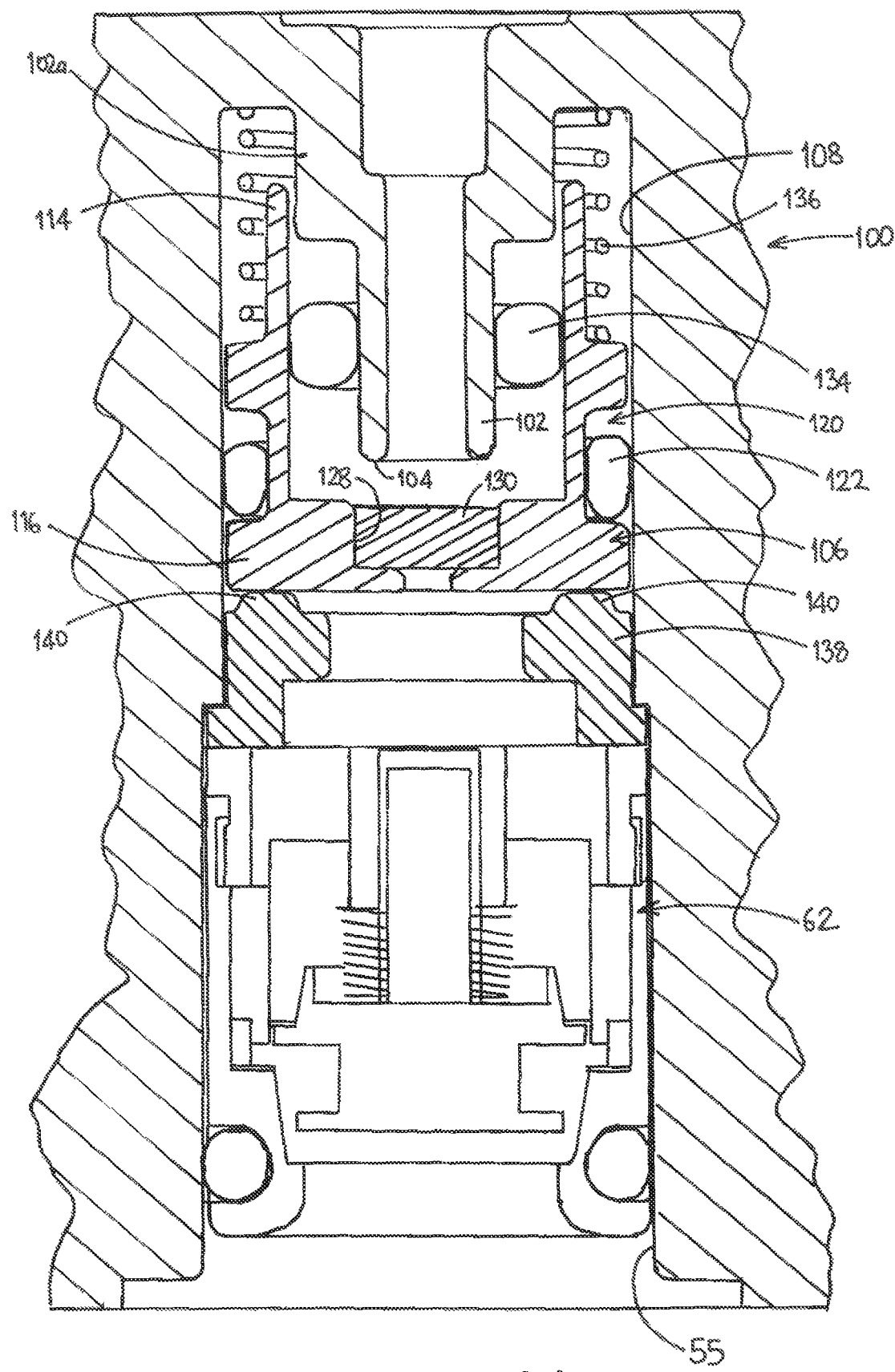
Figure 7B:
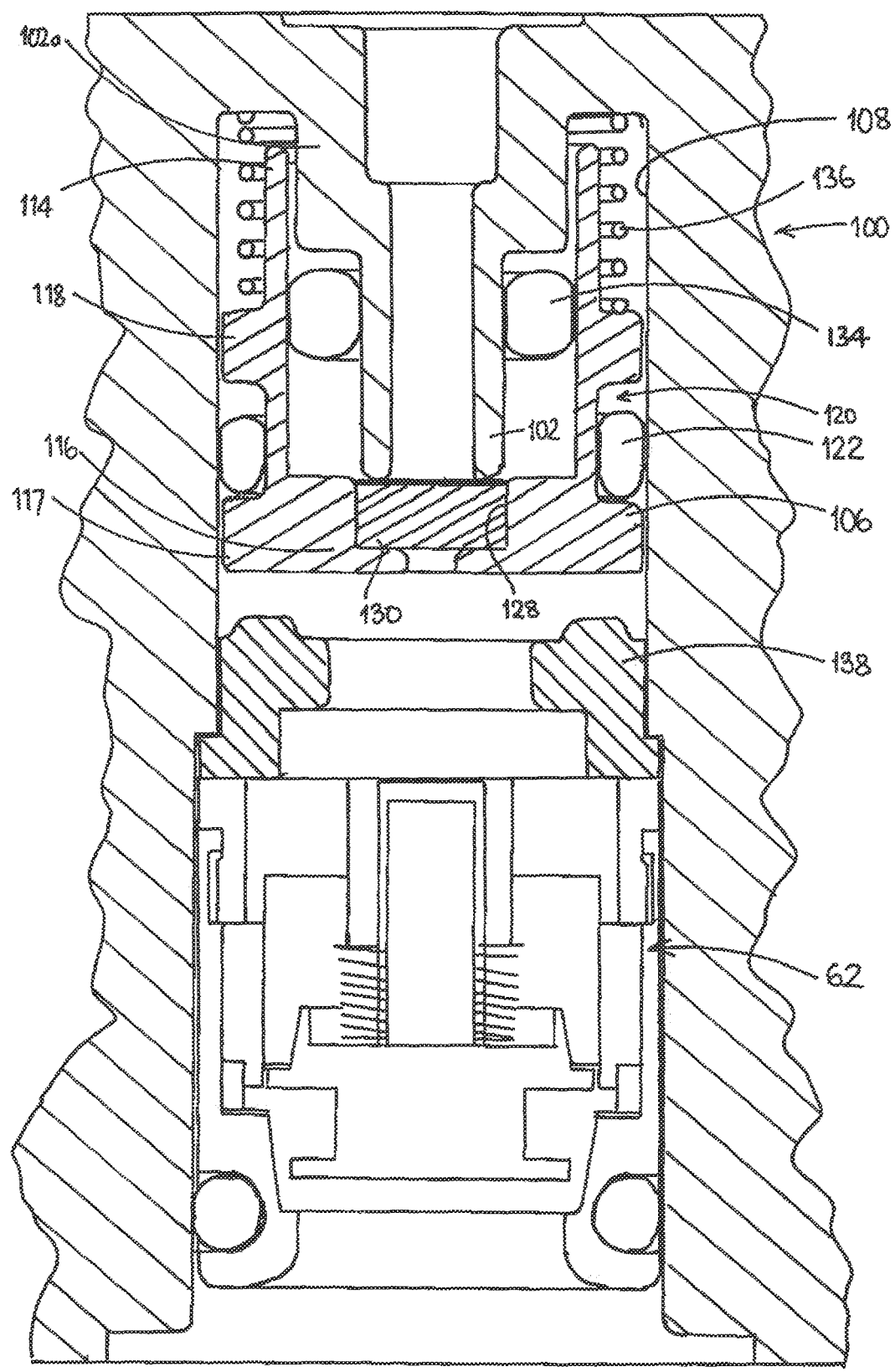
Figure 8:
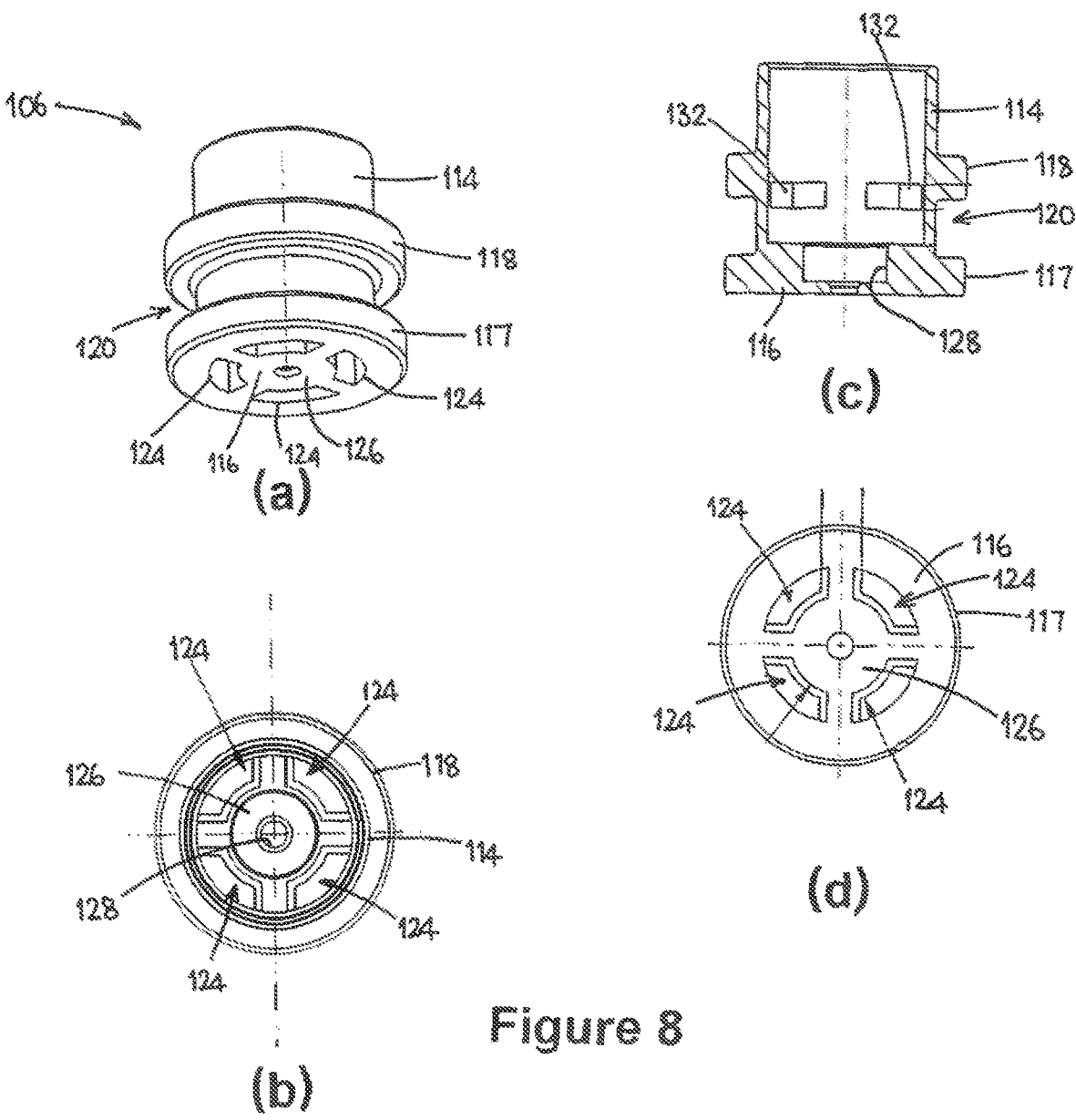
Figure 9:
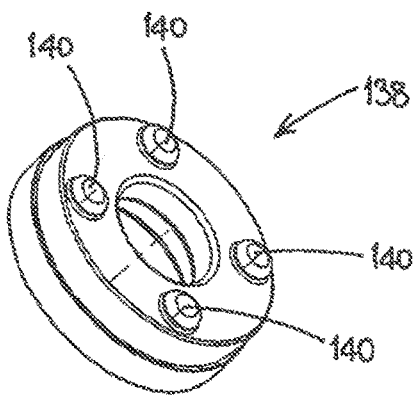

FIGS. 7 (a) and (b) are vertical cross-sections through a pressure reducing valve portion of the connecting portion of FIG. 5 (rotated 90° with respect to the cross-section of FIG. 6), shown in its most open and its closed positions respectively;

FIGS. 8 (a), (b), (c) and (d) are respectively a perspective view, view from above, vertical cross-section and view from below of a piston forming part of the pressure reducing valve portion of FIG. 5; and FIG. 9 is a perspective view of a piston stop which forms part of the valve assembly of FIG. 3.

Figure 3:
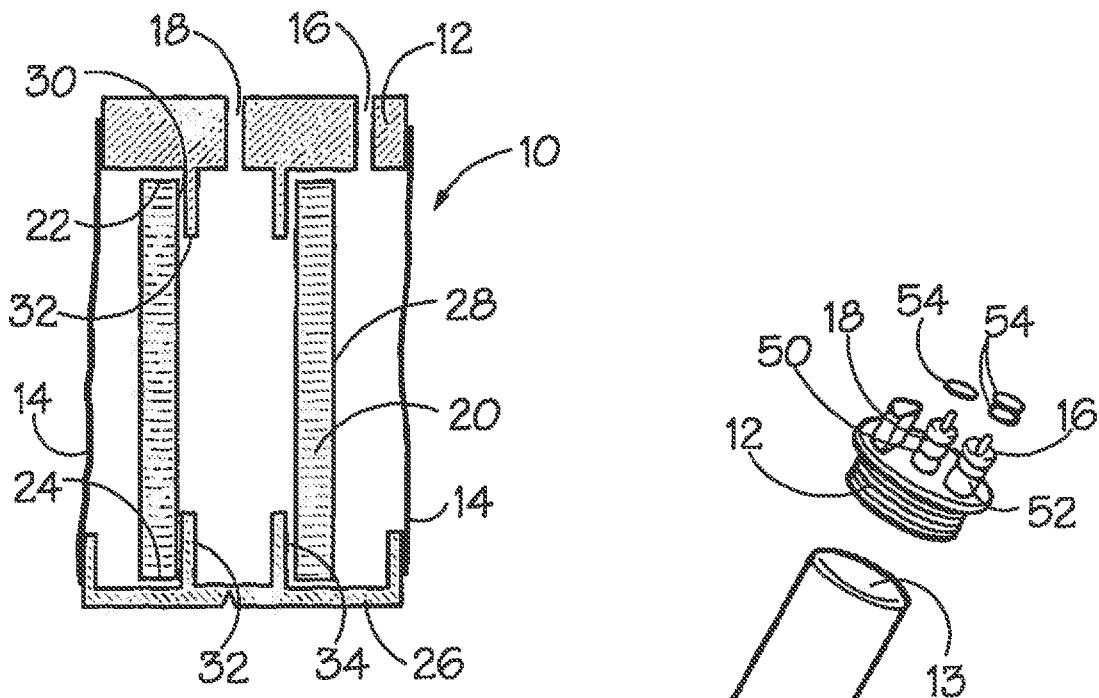
FIG. 3 is a schematic longitudinal cross-section of a filter insert forming part of the filter assembly of FIG. 1.
Figure 4:
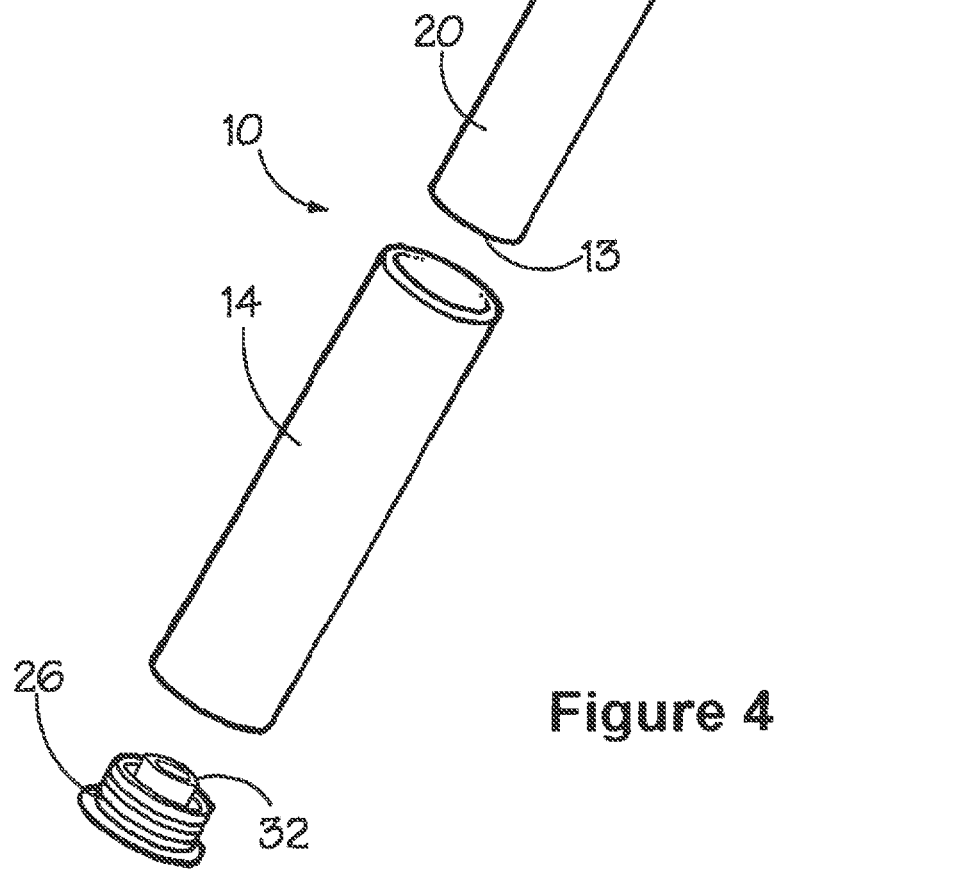
FIG. 4 is an exploded perspective view of the filter insert of FIG. 3.

As shown in FIGS. 3 and 4 in particular, a filter insert 10, in this case a water filter insert, comprises a mounting disc 12 and a flexible plastics tube 14 whose upper end is sealingly affixed around the periphery of the mounting disc 12. In this particular embodiment, the flexible plastics tube comprises a multiple, e.g. three or more, layers of plastics and/or metal foil, but the tube may be formed from other materials such as polyethylene terephthalate (PET). In a preferred embodiment of the invention the flexible plastics tube 14 is sealingly affixed around the periphery of the mounting disc 12 using a thermal bonding process whereby the inner layer plastics tube 14 is melted/fused to the LDPE of the mounting disc 12. Additionally or alternatively, a bead of thermoplastic glue may be used to provide a sealing connection between the tube 14 and disc 12. The lower end of the flexible plastics tube 14 is similarly sealingly affixed around the periphery of a closed-ended, cylindrical closure member 26 using a similar thermal bonding process and/or a bead of thermoplastic glue.

The mounting disc 12 has two through holes, which form the inlet 16 and outlet apertures 18 of the filter insert 10, for connection to a mains water supply (not shown) and a tap (not shown), respectively. In use, water flows from the mains supply into the interior of the flexible tube 14 via the inlet aperture 16, and out of the filter insert 10 through the outlet aperture 18 as shown by the flow arrows.

A porous, tubular filter element 20 is provided within the flexible tube 14. The tubular filter element 20 has square-cut ends, which provide annular surfaces 22, 24 for sealing to the underside of the mounting disc 12 and the flat, interior end wall of the closure member 26, respectively, using beads of thermoplastic glue.

In the present example, the underside of the mounting disc 12 and the closure member 26 each comprise cylindrical spigot portions 32 whose outer surfaces 34 are an interference fit with the interior surface 30 of the filter element 20, and which are provided with outwardly projecting helical thread portions. Such a configuration permits the filter element 20 to be sealingly push-fitted, and/or screw-threadingly engaged (i.e. whereby the helical threads cut into the filter element), onto the spigots to form a seal, rather than, or in addition to, the use of a bead of thermoplastic glue.

Thus, the filter element 20 is sealingly interposed between the inlet 16 and outlet apertures 18 in such a manner that water must pass through the pores of the filter element 20, and thus be filtered thereby, as it flows from the water supply to the tap. It will be noted that by locating the inlet aperture 16 radially outwardly of the outer surface 28 of the filter element 20 and the outlet aperture 18 radially inwardly of the inner surface 30 of the filter element 20, the direction of water flow is generally radially inwardly, which is believed to be best practice.

The filter insert 10 is assembled by the steps of: inserting the filter element 20 into a pre-cut length of flexible plastics tubing 14; push fitting the spigots 32 of the mounting disc 12 and closure member 26 into the ends of the tubular filter element 20; and gluing the interior surfaces of the upper and lower edges 13 of the flexible tube 14 around the outer peripheries of the mounting disc 12 and closure member 26. Such an operation can be readily automated, or carried out manually.

The inlet 16 and outlet apertures 18 communicate with spigots 50, 52 that extend axially outwardly from the upper surface of the mounting disc 12. Each spigot 50, 52 has a pair of circumferential grooves for receiving an O-ring seal 54, whose function shall be described in greater detail below.

Whilst under certain circumstances, it might be possible to use the filter element in isolation, it is probable that the use of the filter element 10 by itself, in a water supply having a moderate to high water pressure, might cause the flexible plastics tube 14 to distend outwardly or burst. As such, additional reinforcement may be needed to counteract this problem, and a relatively rigid outer casing or housing may therefore be provided for the filter insert 10. An example of such an outer casing or housing is shown in FIG. 4.

Figure 1:
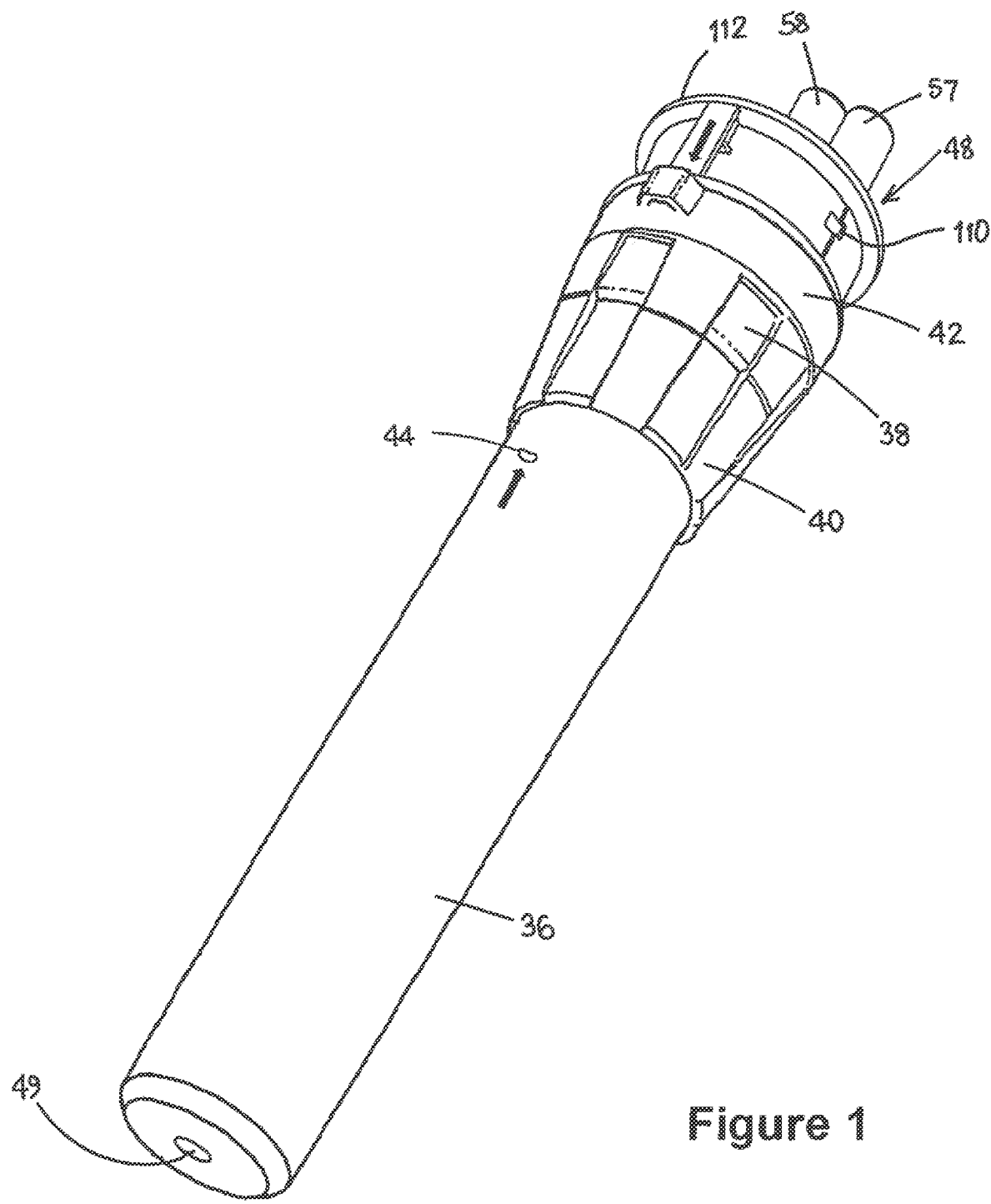
FIG. 1 is a perspective view of an embodiment of filter assembly in accordance with the present invention.
Figure 2:
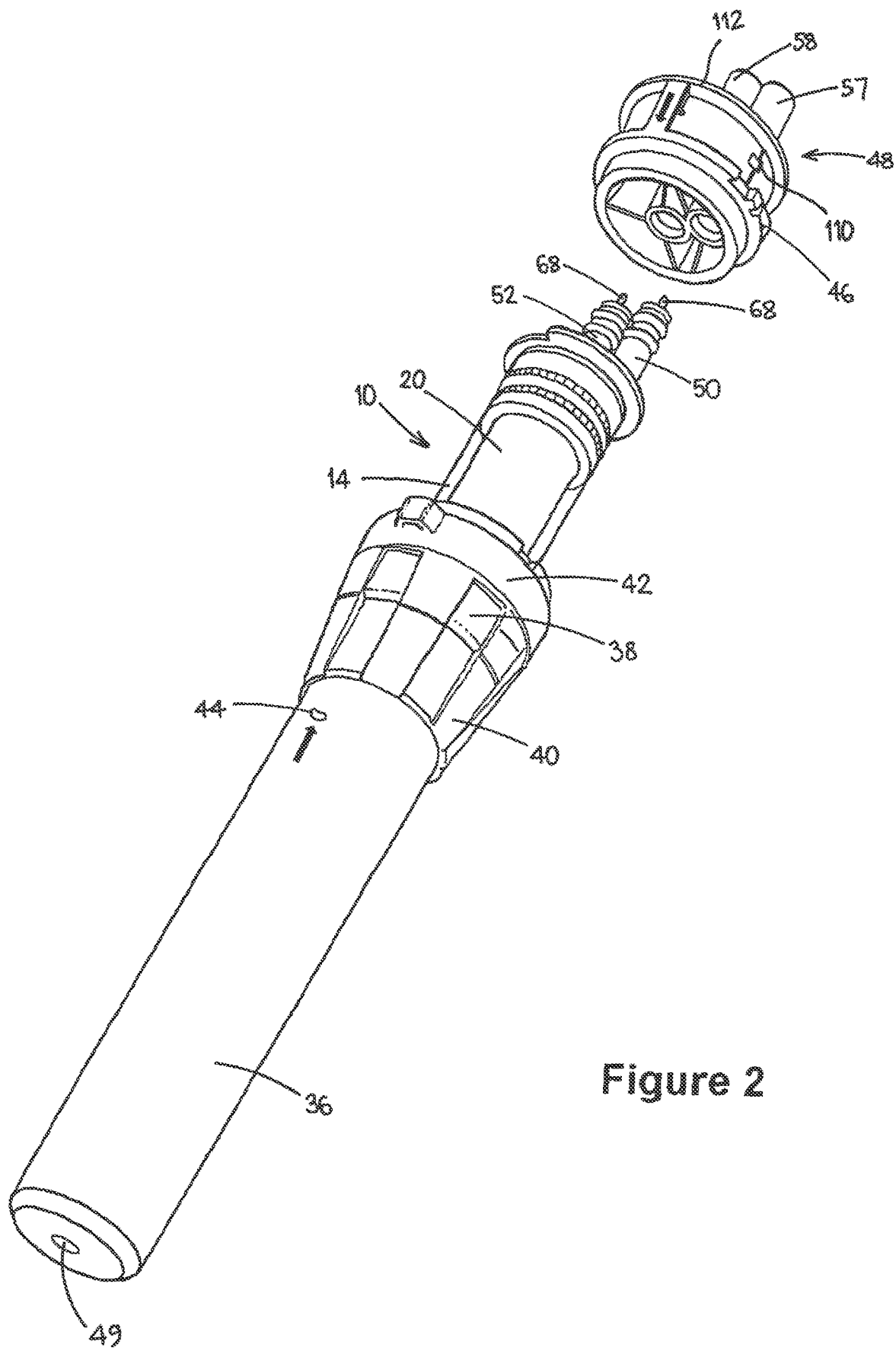
FIG. 2 is an exploded perspective view of the filter assembly of FIG. 1.

In FIGS. 1 and 2, it can be seen that the filter insert 10 is slidingly receivable within the interior of a closed-ended, relatively rigid plastics housing 36. The housing 36 comprises, at its open end, a radially outwardly projecting flange portion 38 that provides a laterally extending abutment surface 40 for a locking collar 42 to engage with. The locking collar 42 is slidingly receivable over the closed end of the housing 36 and is able to resiliently deform so as to slide over and past a pair of diametrically opposed barbs 44 integrally formed with the outer surface of the housing 36 approximately one third of the way along its length. However, owing to the shape of the barbs 44, once the collar 42 has slid past the barbs 44, it is not easily able to slide back off the end of the housing 36.

The interior surface of the open end of the housing 36 and the interior surface of the locking collar 42 have formations therein that engage with complimentarily-shaped engagement formations 46 located on the outer surface of a connector 48, which shall be described in detail below. The engagement formations 46 are unequally spaced at radial positions around the periphery of the connector 48 so that the housing 36 and locking collar 42 can only engage with the engagement formations 46 when they have a particular relative rotational orientation. This asymmetry reduces the likelihood of the housing being incorrectly connected to the connector 48.

The interior of the base wall of the housing 36 carries an axially projecting pin formation 49 that engages a complimentarily shaped and located indentation located on the underside of the end cap 26 of the filter element 10. The pin 49 enables the housing to support the filter medium, which can reduce the likelihood of it breaking during transportation or use.

As can be seen in FIGS. 5 to 7, the interior of the connector 48 is provided with a pair of connector bores 55, 56 whose longitudinal axes are substantially parallel to the longitudinal axis of the filter insert 10 and housing 36, and whose interior sidewalls seal against the O-ring seals 54 of the filter insert's spigots 50, 52. The connector bores 55, 56 communicate with the mains water supply (not shown) and a tap (not shown), respectively, via respective spigots 57, 58 projecting perpendicularly from the upper flat face of the connector. Each of the spigots contains an identical connector insert 59 and O-ring seal 61 for sealing connection of the mains water supply and tap respectively. Thus, the filter insert 10 can be sealingly connected to the mains water supply and the tap via the connector bores 54, 56 and spigots 50, 52 and 57, 58 respectively.

Notably, the interior of the housing 36 does not come into contact with the water at any time since the only flow path is from the mains supply, through the inlet connector bores 55, through the inlet spigot 50 and into the flexible tube 14, through the filter medium 20, through the outlet spigot 52, into the outlet connector bores 56 and then back into the pipe work 48. The need for any seal between the connector 48 and the housing 36 is therefore removed.

Each of the connector bores 55, 56 is provided with a flow-control valve 62, 64. The purpose of the flow control valves is to shut-off the mains supply and tap when the filter insert 10 is removed from the connector 48. The flow control valves 62, 64 generally conventional and are not described in further detail. The flow control valves 62, 64 can be can be opened by the pressure of water or by the force exerted by a nipple 68 extending axially outwardly from the free end of each of the filter insert's spigots 50, 52. When no filter insert 10 is present, the mains water pressure and the pressure of the water in the tap supply pipe forces the valves 62, 64 to close, thereby closing off the respective pipe work. However, when the filter element 10 is correctly inserted and pushed home, the valves 62, 64 are opened to permit water to flow into and out of the filter element 10. Thus, the provision of in-line valves helps to prevent contamination of the water supply and to facilitate connection and disconnection of the filter element 10 by automatically shutting-off and opening the supply and drain pipes. Such a configuration also prevents the water from being used when there is no filter element present, e.g. if the housing 36 were to be connected to the connector, but without a filter element being present.

Additionally, the housing 36 is preferably manufactured from a transparent material, or may be preferably provided with a viewing window (not shown), so that the filter element 10 can be visually inspected without having to remove the housing 36. Thus, various indicia can be provided on the filter element 10, e.g. an installation date, replacement date, filter property data, etc., which indicia can be visually inspected without having to disassemble the filter system.

It will also be noted that the outlet spigot 52 of the filter element 10 is coaxial with the longitudinal axis of the filter insert 10, whereas the inlet spigot 50 is positioned off-centre with respect to the longitudinal axis of the filter insert 10. Such an asymmetric configuration prevents the supply pipe from being inadvertently connected to the filter element's outlet aperture and vice-versa.

The connector 48 is also provided with a pressure-relieving valve 100, which is best seen in FIGS. 7 and 8. It will be seen from the Figures that fluid entering the connector 48 is guided through an internal hollow spigot 102 which is aligned parallel to the longitudinal axis of the valve assembly. The innermost annular end of the spigot 102 is formed into an annular valve seat 104. A generally tubular piston 106, to be described in more detail below, is displaceable with respect to the valve seat 104 and the position of the piston with respect to the valve seat determines the flow of fluid into the valve assembly and thereby the pressure of the fluid which is fed to the filtering elements of the valve assembly.

The piston 106 is slidably and sealingly mounted in a bore 108 which is an extension of the connector bore 55 in which the flow control valve 62 is mounted. The bore 108 is closed at its upper end and the spigot 102 projects into the bore 108. An air bleed passage 110 extends between the bore 108 and the exterior of the connector 48, at a location just below the uppermost portion of the bore and below a radially extending peripheral flange 112 located at the outer end of the connector 48.

The piston 106 comprises a generally tubular wall 114, a lower end wall 116, a first annular peripheral rim 117 extending outwardly from the outer face of the lower end the tubular wall 112 and a second annular peripheral rim 118 extending outwardly from the outer face of the tubular wall approximately halfway along its length. The outer faces of the first and second rims 117, 118 are cylindrical and their outer diameter corresponds to the inner diameter of the bore 108. An annular groove 120 is defined between the first and second referral rims 117, 118 and, in use, receives an O-ring seal 122 which sealingly engages the bore 108.

The lower end wall 114 is provided with four identical apertures 124. Each of the apertures 124 is part-annular, centred on the longitudinal axis of the piston 106, and connects the lower face of the piston 106 with the interior of the piston as defined by the wall 114. The central circular portion 126 of the lower end wall 116 radially inwardly of the apertures 124 is provided with a recess 128 for receipt of a seal 130 which is engageable with the annular valve seat 104 defined by the innermost end of the spigot 102, as will be explained.

The inner face of the tubular wall 114 is also provided with four identical inwardly projecting lugs 132, equally angularly spaced around the tubular wall 114, for supporting a further O-ring seal 134 which, in use, sealingly engages the outer face of the spigot 102, as will be explained.

In use, a helical compression spring 136 is located around the upper end of the piston 106 and rests against the upper face of the second rim 118. The piston 106 is inserted into the bore 108 and the upper end of the spring for 36 abuts the closed end of the bore 108. The O-ring seal 122 in the annular groove 120 sealingly engages the cylindrical face of the bore 108 and the second O-ring seal 134 sealingly engages the outer surface of the spigot 102. The outermost end of the spigot 102 is also formed into a larger diameter portion 102a having an external diameter slightly smaller than the internal diameter of the tubular wall 12, to assist in guiding the movement of the piston 106.

The compression spring 136 urges the piston out of engagement with the annular valve seat 104 of the spigot 102 (downwardly as shown in the Figures) and the downward displacement of the piston is limited by an annular piston stop 138 which is secured in the bore 108 such that it engages the upper face of the flow control valve 62. The upper face of the annular piston stop 138 is provided with four identical upstanding lugs 140, equally angularly spaced around the periphery and which, in use, engage the lower end wall 116 of the piston 106 when the piston 106 is in its innermost position. The provision of the lugs 140 ensures that fluid can still flow even when the piston 106 abuts the annular piston stop 138, as will be explained.

When the valve is assembled as described, fluid is fed into the assembly. As described previously, the piston is urged out of engagement with the annular valve seat 104 formed by the inner end of the spigot 102 by the compression spring 136. Fluid entering the valve assembly is thereby able to pass through the apertures 124 of the piston. Fluid pressure from the incoming fluid acts both on the internal surfaces of the piston 106 and also on the undersurface of the lower end wall 116 of the piston 106. It is important to those that the surface area of the undersurface of the lower end wall of the piston is greater than the effective surface area of the internal surfaces of the piston (i.e. those portions which produce a force in the opening direction of the valve), whereby fluid flowing into the valve produces a net upward force on piston 16, against the force of the compression spring 136.

The position of the piston 106 with respect to the valve seat formed by the end of the spigot 102 is therefore governed by the pressure of the incoming fluid. Consequently, the rate of fluid flow out of the spigot 102, and thereby the pressure of fluid below the piston 106, is governed.

For a low incoming fluid pressure, the piston will be in abutment with the annular piston stop 138 and the fluid pressure below the piston will depend only on factors such as the cross sectional area of the apertures 124, the internal diameter of the piston stop 138, and the like.

For a high incoming pressure, the force applied to the piston by virtue of the pressure causes the piston to be lifted from the piston stop 138 towards the valve seat 104 of the spigot 102. The flow of fluid to the interior of the piston, and therefore the pressure of fluid below the piston, is thereby attenuated. In circumstances of extremely high pressure, the piston is displaced into its uppermost position as shown in the Figures, in which the seal 130 in the lower end wall 114 of the piston is in sealing engagement with the valve seat 104 of the spigot 102.

Typically, the piston will "float" between its two extreme positions, as governed by the pressure of the incoming fluid and the characteristics of the compression spring 136, such that the pressure of fluid below the piston is limited to a desired value. The air bleed passage 110 ensures that the region of the bore 108 adjacent to its closed end is not closed off, which would otherwise result in an increased or reduced pressure within that region, which would influence the position of the piston 106 within the bore 108.

By limiting the pressure below the piston 106, it is possible to ensure that the filter elements of the filter assembly are not subjected to pressures which might cause damage to them.

The invention is not limited to the details of the foregoing embodiment. For example, the shape, dimensions and materials of manufacture of some or all of the elements thereof may be altered. Moreover, certain components may be omitted, if desired. For example, the flow-control valve 62 below the pressure relieving valve 100 may be omitted, in which case it would be replaced by a packing spacer of the same dimensions as the flow-control valve in order to hold the pressure-relieving valve in place. Furthermore, although the invention has been described it the context of water filters, it is not restricted to water filters: it could be used for filtering any fluid, for example, non-potable water, blood and other body fluids, paint, chemicals, liquid and/or gaseous fuels.

What is claimed is:

1. A filter assembly comprising:
    a fluid inlet;
    a fluid outlet; and
    a filter medium for receipt of fluid from the fluid inlet and for supplying filtered fluid to the fluid outlet, the filter medium being located between the fluid inlet and the fluid outlet,
    the filter assembly further comprising:
        a pressure-limiting means located between the fluid inlet and the filter medium, wherein the pressure-limiting means comprises a pressure relief valve having:
            a valve closure member comprising a piston displaceable within a bore, the valve closure member releasably engageable with a valve seat connected to the fluid inlet, wherein the piston comprises an aperture for allowing the fluid to flow from an upstream side of the piston to a downstream side of the piston, wherein the piston comprises an effective downstream surface that is larger than an effective upstream surface; and
            a spring means engaged with the piston for urging the valve closure member away from engagement with the valve seat
        wherein the valve closure member is urged towards the engagement with the valve seat when a force exerted from fluid pressure applied to the effective downstream surface of the piston exceeds a net force from the fluid pressure applied to the effective upstream surface of the piston and a force exerted by the spring means.

2. The filter assembly as claimed in claim 1, wherein when the valve closure member is disengaged from the valve seat, fluid pressure is applied to a first surface of the valve closure member which produces a first force urging the valve closure member in a first direction, and to a second surface of the valve closure member which produces a second force urging the valve closure member in a second direction opposite to the first direction.

3. The filter assembly as claimed in claim 2, wherein the first and second forces are unequal.

4. The filter assembly as claimed in claim 3, wherein a net effect of the first and second forces urges the valve closure member towards the engagement with the valve seat.

5. The filter assembly as claimed in claim 1, comprising a spigot connected to the fluid inlet, the valve seat being located at a distal end of the spigot.

6. The filter assembly as claimed in claim 1, comprising air bleed means.

7. The filter assembly as claimed in claim 6, wherein the air bleed means is an air bleed passage.

8. The filter assembly as claimed in claim 1, wherein the valve closure member comprises a piston displaceable within a bore.

9. The filter assembly as claimed in claim 8, comprising an air bleed passage connected to the bore.

10. The filter assembly as claimed in claim 8, comprising means for limiting a displacement of the piston in a direction away from the engagement with the valve seat.

11. The filter assembly as claimed in claim 1, further comprising a filter insert comprising a body portion and a tube having a closed end and an open end, wherein the open end of the tube is sealingly affixed around a periphery of the body portion, an inlet aperture and an outlet aperture, each inlet and outlet aperture communicating via a through hole in the body portion with an interior of the tube, the filter medium being located within the tube and being sealingly interposed between the inlet aperture and the outlet aperture.

12. The filter assembly as claimed in claim 11, further comprising a connector and a housing detachably affixable to the connector; a fluid inlet aperture and a fluid outlet aperture being located on the connector; and the filter insert being removably receivable in the housing; the inlet aperture and the outlet aperture of the filter insert being releasably and sealingly connectable to the corresponding fluid inlet and fluid outlet apertures of the connector and a substantially fluid impermeable barrier surrounding the filter insert and being arranged to prevent the fluid from coming into contact with the housing.

13. The filter assembly as claimed in claim 12, further comprising a locking collar for releasably locking the housing to the connector.

14. The filter assembly as claimed in claim 13, comprising a part-turn locking mechanism having a first position in which the housing is locked to the connector, a second position in which the housing is retained to the connector but capable of an axial movement relative to the connector and a third unlocked position in which the housing is unblocked from the connector.

15. The filter assembly as claimed in claim 12, further comprising a flow control valve to restrict flow of fluid through the connector when the housing is detached from the connector.

16. The filter assembly as claimed in claim 15, comprising a first flow control valve connected to the fluid inlet aperture of the connector and a second flow control valve connected to the fluid outlet aperture of the connector.

17. The filter assembly as claimed in claim 15, wherein the flow control valve is located in the connector.

\* \* \* \* \*